United States Patent [19]
Nakamura et al.

[11] 3,857,596
[45] Dec. 31, 1974

[54] AUTOMOBILE BUMPER ASSEMBLY
[75] Inventors: Kihei Nakamura, Yokohama; Harumichi Yamazaki; Kazuo Takeguchi; Yoshikazu Kondo, all of Tokyo, Japan
[73] Assignee: Bridgestone Tire Company, Inc., Tokyo, Japan
[22] Filed: Dec. 27, 1973
[21] Appl. No.: 428,681

Related U.S. Application Data
[62] Division of Ser. No. 260,331, June 6, 1972, abandoned.

[30] Foreign Application Priority Data
Aug. 13, 1971 Japan............................ 46-60962

[52] U.S. Cl..................... 293/88, 293/86, 267/140
[51] Int. Cl............................................. B60r 19/06
[58] Field of Search ......... 293/70, 71 R, 85, 86, 88, 293/89; 114/219; 267/35, 63 R, 63 A, 140, 141, 153

[56] References Cited
UNITED STATES PATENTS
| 1,515,255 | 11/1924 | Kerber | 293/88 |
| 1,602,922 | 10/1926 | Midboe | 267/63 R |
| 3,752,462 | 8/1973 | Wight, Jr. | 267/140 |
| 3,795,419 | 3/1974 | Niemkiewicz | 267/140 |

Primary Examiner—M. Henson Wood, Jr.
Assistant Examiner—Robert Saifer
Attorney, Agent, or Firm—Fleit & Jacobson

[57] ABSTRACT

An automobile bumper assembly having a plurality of hollow tubular elastomer members, each having opposite ends connected to an automobile body and a fender rod, respectively. The overall cross sectional area of the elastomer member is 1.44 to 4.0 times that of the hollow space thereof, taken at right angles to the longitudinal center line of the elastomer member. The elastomeric material of the elastomer member has a hardness of 63° to 104°.

4 Claims, 18 Drawing Figures

AUTOMOBILE BUMPER ASSEMBLY

This is a continuation, division of application Ser. No. 260,331, filed June 6, 1972 now abandoned.

BACKGROUND OF THE INVENTION

1. Field of the Invention

This invention relates to an automobile bumper assembly, and more particularly to an automobile bumper assembly which includes a plurality of hollow tubular elastomer members inserted between an automobile body and a fender member thereof, so as to provide a high shock absorbing capacity.

2. Description of the Prior Art

Conventional automobile bumpers are made of resilient metallic members, such as leaf springs or coiled springs. The bumpers using metallic resilient members alone have a shortcoming in that its shock absorbing capacity for collisions at a low-speed is comparatively low.

An object of the present invention is to obviate the aforesaid shortcoming of conventional automobile bumpers, by providing a simple and inexpensive automobile bumper assembly including a plurality of hollow tubular elastomer members which can absorb a large amount of shock energy regardless of vehicular speed at the time of collision.

SUMMARY OF THE INVENTION

According to the present invention, there is provided an automobile bumper assembly, which includes a fender member made of a metallic or a synthetic resin material and disposed at the front or rear portion of an automobile body, and a plurality of hollow tubular elastomer members disposed between the fender member and the automobile body.

The tubular elastomer member may have a circular or rectangular or polygonal cross sectional shape. For simplicity's sake, the invention will be described by referring to embodiments using cylindrical elastomer members with circular cross sections, but it should be understood that tubular elastomer members with other cross sectional shapes can also be used in the bumper assembly of the invention.

Each of the cylindrical elastomer members has a cylindrical hollow space coaxially formed therein. The hollow cylindrical elastomer member is made of a suitable elastomer, e.g., natural rubber or synthetic rubber, which has a Shore A hardness of 63° to 104°. Suitable mounting flanges or rings are secured to the longitudinally opposite ends of the cylindrical elastomer member, so as to facilitate its connection to the fender member and the automobile body, respectively. Taking at right angles to the longitudinal axis of the cylindrical elastomer member, the cross sectional area $S_1$ of the cylindrical member in terms of the area of a circle defined by the outer periphery of the cylindrical member should be 1.4 to 4.0 times the cross sectional area $S_2$ of the aforesaid cylindrical hollow space thereof, namely $1.44 \leq (S_1/S_2) \leq 4.0$.

The shock absorbing capacity of the cylindrical elastomer member tends to vary to a great extent, depending on the angle of the load applied thereto relative to the longitudinal axis thereof. To reduce such load angle dependence of the shock absorbing capacity, different cylindrical elastomer members in one bumper assembly may be disposed at different angular relations to the longitudinal axis of an automobile, which is to be protected by the bumper assembly. It is also possible to add a core rod member in each hollow cylindrical elastomer member, so as to extend in a coaxial manner. In this case, the core bar member should preferably be kept in parallel to the longitudinal axis of an automobile being protected by the bumper assembly.

BRIEF DESCRIPTION OF THE DRAWING

For a better understanding of the invention, reference is made to the accompanying drawings, in which.

Like parts are designated by like numerals and symbols throughout the different figures of the drawing.

DESCRIPTION OF THE PREFERRED EMBODIMENTS

Figure 1:
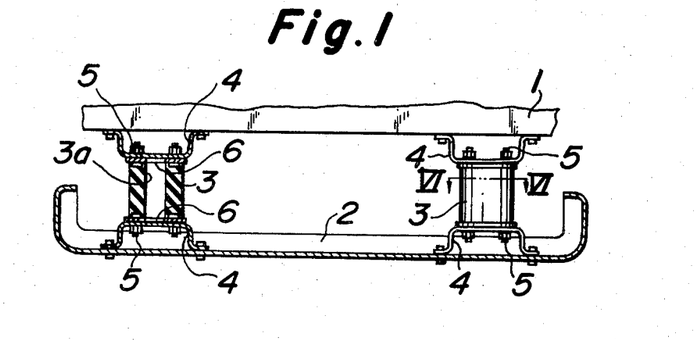
FIG. 1 is a schematic plan view, with a part in section, of an automobile bumper assembly, according to the present invention.
Figure 2:
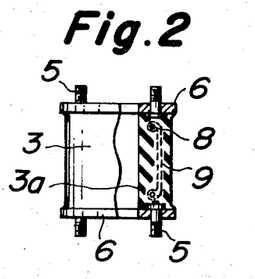
FIGS. 2 to 5 are diagrammatic illustrations of different hollow cylindrical elastomer members to be used in the automobile bumper assembly of the present invention.

Referring to FIG. 1, a part of automobile body 1 is shown, to which a shock-receiving plate member 2, e.g., a fender rod, is connected through a plurality of hollow cylindrical elastomer members 3. The shock-receiving plate member 2 is, for instance, made of a suitable metallic or synthetic resin material. Elastomeric material for the hollow cylindrical members 3 may be natural or synthetic rubber. To facilitate the connection of the cylindrical elastomer members 3 to the shock-receiving member 2 and the automobile body 1, suitable flanges or rings are formed at opposite longitudinal ends of each hollow cylindrical elastomer member 3. The flanges or rings may be directly connected to the shock-receiving member 2 and the automobile body 1. It is, however, more practical to secure suitable metallic mounting fixtures 4 to the body 1 and the fender rod 2 at desired points of connection. In the illustrated embodiment, mounting rings 6 with bolts 5 may be secured to the opposite ends of the hollow cylindrical elastomer body 3, as shown in FIGS. 2 to 5. With such bolts 5 secured to the individual cylindrical elastomer members 3, a bumper assembly according to the present invention can be fabricated simply by connecting the shock-receiving member 2 to the automobile body 1 through the cylindrical elastomer members 3 by fastening the bolts 5 to the mounting fixtures 4 with nuts.

In the embodiment of FIG. 1, only two cylindrical elastomer members 3 are shown, but it is possible to incorporate three or more such elastomer members 3 in the assembly.

With the bumper assembly according to the present invention, the elastomer members 3 must have a high energy absorbing capacity. To this end, the inventors have found out that the elastomeric material constituting the member 3 must have a Shore A hardness of 63° to 104°. The preferable cross sectional shape of the member 3 is circular, but the invention is not restricted to it. For instance, hollow elastomer members 3 each having a polygonal cross sectional shape may be used in the bumper assembly of the invention. To achieve a high energy absorbing capacity, each elastomer member 3 must have a hollow space 3a, which is coaxially formed therein. Both the elastomer member 3 and the hollow space 3a therein are assumed to be cylindrical for purposes of description.

Figure 6:
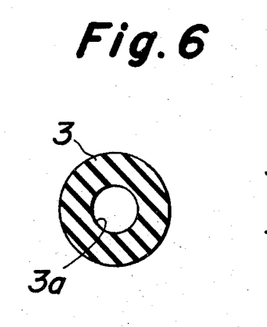
FIG. 6 is an enlarged sectional view, taken along the line VI—VI of FIG. 1.
Figure 9:
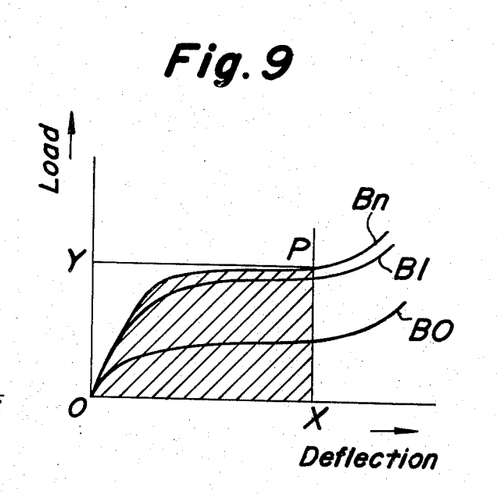
FIG. 9 is a graph which illustrates the definition of percent energy absorption by the automobile bumper assembly according to the present invention.

To determine the suitable size of the hollow space 3a, tests were made on samples having different $S_1/S_2$ ratios, $S_1$ being the total cross sectional area of the elastomer member 3 encircled by the outer periphery of the cylinder, $S_2$ being the cross sectional area of the hollow space 3a (see FIG. 6). More particularly, the area $S_1$ includes the area $S_2$. Percent energy absorptions of the test samples with different $S_1/S_2$ ratios were measured. The amount of energy absorbed by the elastomer member is represented by the area below the load-deflection curve of the elastomer member, as shown in FIG. 9. The "percent energy absorption" is defined by the following equation, while referring to a load-deflection curve $Bn$ in the graph of FIG. 9.

$$\text{Percent energy absorption} = \frac{\text{Hatched area}}{\text{Area of rectangle OYPX}}$$

In the tests, the above percent energy absorptions were measured for deflection of 50 percent for each test elastomer member 3. Test results are shown in FIG. 8.

Figure 8:
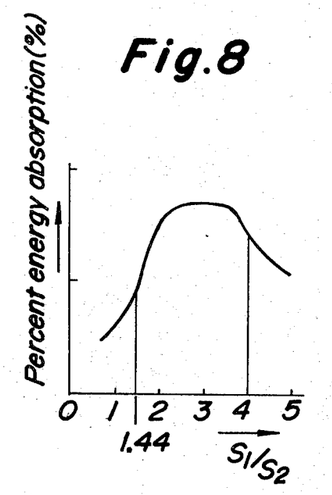
FIG. 8 is a graph, illustrating how every absorption by a hollow cylindrical elastomer member varies in response to the variation of the size of its hollow space.

As can be seen from FIG. 8, hollow cylindrical elastomer members 3 with the aforesaid $S_1/S_2$ ratio of 1.44 to 4.0 provide percent energy absorption. Accordingly, the elastomer members to be used in the bumper assembly of the invention are required to have the $S_1/S_2$ ratio of 1.44 to 4.0 provide high percent energy absorption. Accordingly, the elastomer members to be used in the bumper asssembly of the invention are required to have the $S_1/S_2$ ratio of 1.44 to 4.0.

The inventors have also found out that the length H of each elastomer member, taken along its longitudinal axis, preferably falls in a certain range which can be defined relative to the outer diameter D of the cylindrical elastomer member: for instance, $0.9D < H < 1.5D$. In the case of a tubular elastomer member having a rectangular or polygonal cross section, the mean value of the diameters of a circumscribed and an inscribed circles of the cross section may be used as the aforesaid dimension D for determining the length H.

Figure 7:
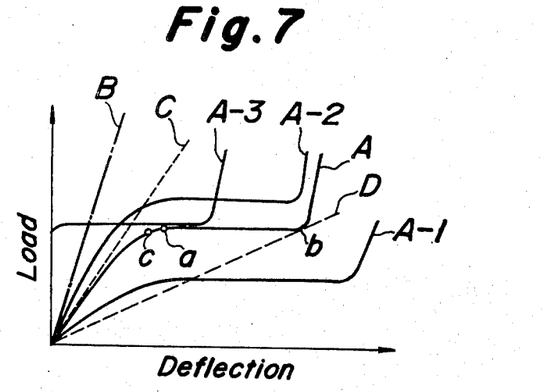
FIG. 7 is a graph, showing load-deflection characteristics of the automobile bumper assembly of the invention, in comparison with the similar characteristics of conventional automobile bumper assembly.

The operation of the automobile bumper assembly, as illustrated in FIG. 1, will now be described by referring to load-deflection characteristics curves of FIG. 7. The curve A of FIG. 7 represents the load-deflection characteristics of the automobile assembly of FIG. 1. When a shock is applied to the shock-receiving member 2, e.g., a fender rod, the hollow cylindrical elastomer members 3 are at first compressed to absorb the shock energy. If the magnitude of the shock energy applied to the shock-receiving member 2 is greater than a certain value, the elastomer bodies 3 buckle, because each of the elastomer members is provided with a suitable hollow space 3a. The point $a$ in the curve A of FIG. 7 represents a point where such buckling of the elastomer member 3 in the bumper assembly begins. Even after the beginning of the buckling, the elastomer members continue its energy absorption, until the curve A reaches the point $b$, where the longitudinally opposite ends of the elastomer member 3 are substantially brought in contact with each other as a result of the load in excess of the buckling point $a$.

It is one of the important features of the invention that the load-deflection characteristics of the bumper assembly has a substantially flat portion between the aforesaid two points $a$ and $b$. With such a flat portion $ab$, the amount of energy absorbed by the elastomer member 3 is greatly improved, as can be seen from the hatched portion of FIG. 9. More particularly, a bumper assembly exclusively consisting of metallic parts has a linear load-deflection characteristics, such as the line B of FIG. 7. For a given load, the energy absorption by a bumper with the operative characteristics A is much greater than that obtainable with the characteristics of the straight line B. The use of solid elastomer connectors between a fender rod 2 and an automobile body 1 instead of metallic connectors will cause the load-deflection characteristics curve A to become another curve C of FIG. 7. If an elastomer having a small hardness is used to make the solid connectors, the load-deflection characteristics will be further changed to the curve D of FIG. 7.

With the characteristics of the curves B and D, the magnitude of the reaction to the automobile driver will be reduced, as compared with that generated by the characteristics A. In order to achieve a large energy absorption, however, the bumper assembly with the load-deflection characteristics C or D should have a large deflection or stroke at the time of collision. With an increased deflection or stroke, the bumper assembly becomes bulky, and a public demand for a compact or small bumper assembly cannot be met.

A load-deflection characteristics curve similar to the curve A of FIG. 7 may be obtained by using an elastomeric material having a very small hardness, but in this case, the cross sectional areas $S_1$ and $S_2$ are required to be large. The large cross sectional areas $S_1$ and $S_2$ contradict the need for small bumper assemblies. Thus, the use of hollow cylindrical elastomer members made of an elastomeric material with the aforesaid Shore A hardness of 63° to 104° is necessary for making desirable compact bumper assemblies according to the present invention.

The load-deflection characteristics curves of FIG. 7 are derived for loads applied to the bumper assembly substantially in parallel with the longitudinal axes of the cylindrical elastomer members 3. The elastomer members 3 have such a shearing strength that the load-deflection characteristics of the bumper assembly for loads applied at an angular relation to the longitudinal axes of the elastomer members 3 will be similar to those as illustrated in FIG. 7.

FIGS. 2 to 5 illustrate different configurations of the hollow cylindrical elastomer member 3 per se, which can be used in the automobile bumper assembly according to the present invention. In a cylindrical elastomer member 3 of FIG. 2, a pair of bead wires 8 are embedded at longitudinal end portions thereof, and suitable reinforcing members 9, such as fibrous reinforcements, are so disposed as to extend across the two beads through the elastomeric material of the member 3.

Figure 3:
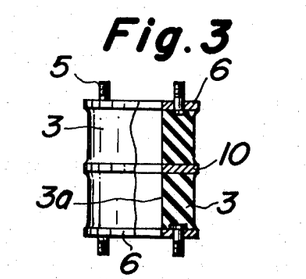

An intermediate annular disk 10, which is made of a metal or other much harder material than the elastomer, may be disposed at the longitudinally central portion of the hollow cylindrical elastomer member 3, as shown in FIG. 3. The intermediate annular disk 10 is arranged at right angles to the longitudinal axis of the elastomer member 3. The construction of FIG. 3 is suitable for producing a load-deflection characteristics having a large deflection at a comparatively low load, as shown by the curve A-1 of FIG. 7.

Figure 4:
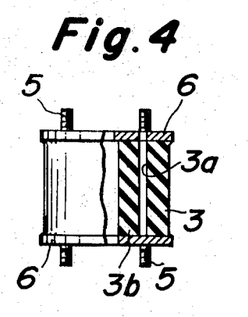

FIG. 4 shows another form of the hollow cylindrical elastomer member 3 having a dual construction. With the construction of FIG. 4, an inner cylindrical elastomer member 3b is coaxially disposed within the hollow space in the cylindrical elastomer member 3. The construction of FIG. 4 is suitable for providing a comparatively high buckling load, as shown by the curve A-2 of FIG. 7.

Figure 5:
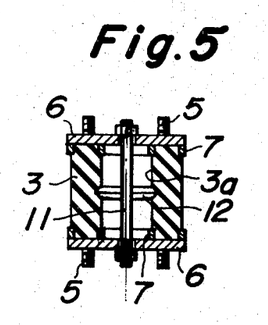

FIG. 5 shows a prestressed construction of the hollow cylindrical elastomer member 3. In the figure, a prestressing bolt 11 is disposed along the longitudinal axial center line of the member 3, and the member 3 is prestressed by being tightened by a nut engaging the bolt 11. When such prestressed cylindrical members 3, as shown in FIG. 5, are used to form an automobile bumper assembly, the load-deflection characteristics of such bumper assembly will become as shown by the curve A-3 of FIG. 7. To ensure reliable buckling of the cylindrical member 3, an annular groove 12 may be formed on the inner surface of the member 3 at about the longitudinal midpoint thereof, as shown in FIG. 5.

To facilitate the mounting of the hollow cylindrical elastomer member 3 to the bumper assembly, a pair of metallic mounting rings 6 may securely be bonded to opposite ends of each member 3 during the shaping and vulcanizing process. It is also possible to secure a pair of coaxial annular projections 7 to the mounting ring 6, for instance by welding, and the mounting ring 6 may be secured to the elastomer member 3 by partially bending the annular projections 7 toward each other, as shown in FIG. 5. The mounting bolts 5 may be secured to the mounting ring 6 by suitable means, e.g., by welding.

As described in the foregoing, with the automobile bumper assembly according to the present invention, mechanical impact can efficiently be absorbed even in a collision at a comparatively low-speed, e.g., slower than about 30 Km/hour. Thus, the reaction to drivers at such collision is greatly reduced, as compared with conventional bumpers, so as to improve the safety of the drivers. Furthermore, the construction of the bumper assembly of the present invention is very simple and can be manufactured at a comparatively low cost. The construction of the present invention may also be incorporated in conventional bumper assemblies consisting of metallic parts alone.

Figure 10:
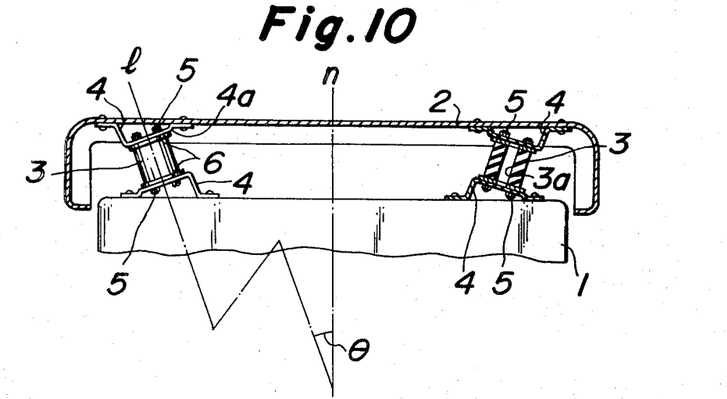
FIGS. 10 to 12 are schematic plan views, similar to FIG. 1, showing different arrangements of hollow cylindrical elastomer members in the automobile bumper assembly, according to the present invention.
Figure 11:
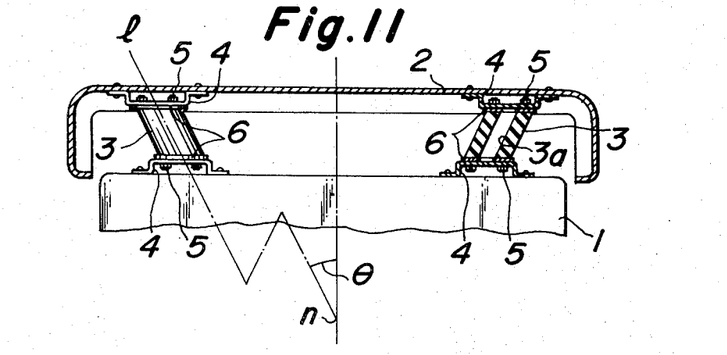
Figure 12:
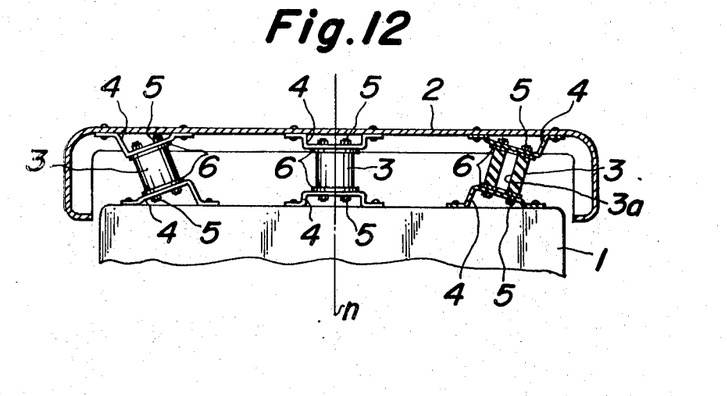

Referring to FIGS. 10 to 12, the hollow cylindrical elastomer members 3 may be connected to an automobile body 1 and a shock-receiving member 2 at an angular relation to the longitudinal center line of the automobile body 1. With the arrangement of the elastomer members 3, as shown in FIGS. 10 to 12, the dependence of the load-deflection characteristics of the bumper assembly on the angle at which the load is applied to the bumper assembly will be reduced. In the embodiment of FIG. 10, a pair of hollow cylindrical elastomer members 3 are provided between an automobile body 1 and a shock-receiving member 2 at an angle $\theta$ to the direction of the longitudinal center line $n$ of the body 1, on opposite sides of the center line $n$. More particularly, the longitudinal axis $l$ of the cylindrical elastomer member 3 is disposed at an angle $\theta$ to the direction of the longitudinal axial center line $n$ of the automobile body 1, and the automobile body side end of each elastomer member 3 is located closer to the axial center line $n$ of the automobile body than the opposite end of the member 3 is. Each cylindrical elastomer member 3 in the embodiment of FIG. 10 has a pair of mounting rings 6 secured thereto at right angles to the longitudinal axis $l$ thereof, and the aforesaid angular relation between the elastomer member 3 and the automobile body 1 is accomplished by using suitably angled metallic fixtures 4. To achieve a balanced performance, at least two such hollow cylindrical elastomer member 3 should be included in the bumper assembly, in symmetry with each other relative to the longitudinal axial center line of the automobile body 1.

In the embodiment of FIG. 10, each of the metallic fixtures 4 has a mounting surface $4a$ which is so inclined as to ensure the aforesaid angular relation between the longitudinal axis $l$ of the elastomer member 3 and the direction of the longitudinal axial center line $n$ of the automobile body 1. Such mounting surface $4a$ can, of course, be formed directly on the shock-receiving member 2 and the automobile body 1 at suitable locations thereof, for purposes of directly mounting the elastomer members 3 thereto.

In the embodiment of FIG. 11, each hollow cylindrical elastomer member 3 has a pair of mounting rings 6, which are secured to the opposite longitudinal ends of the members 3 at an angle $\theta$ relative to the longitudinal axial center line $l$ of the cylindrical member 3. Thus, the desired angular relation between the axial center line of the automobile body 1 and the longitudinal axis of the hollow cylindrical elastomer member 3 can be achieved by using simple mounting means 4 similar to those of FIG. 1.

With the bumper assembly according to the present invention, it is possible to dispose some elastomer members 3 in the aforesaid angular relation with the longitudinal axis of the automobile body 1, while disposing other elastomer member or members 3 in parallel with the longitudinal axis of the automobile body 1, as shown in FIG. 12. In the case of FIG. 12, three hollow cylindrical elastomer members 3 are used, in which the central member 3 is disposed in alignment with the direction of the longitudinal center line $n$ of the automobile body 1, while the remaining two hollow cylindrical elastomer members 3 are disposed on opposite sides of the center line $n$ of the automobile body 1 in an angular relation therewith.

Tests were made on the energy absorption characteristics of different bumper assembly constructions; namely, a bumper assembly P having two hollow cylindrical elastomer members 3 disposed in parallel with the direction of the longitudinal center line $n$ of the automobile body 1, a bumper assembly Q having two hollow cylindrical elastomer members 3 disposed on opposite sides of the center line $n$ of the automobile body 1 at an angle $\theta$ of 22.5°, and a bumper assembly R similar to the aforesaid assembly Q except that the angle $\theta$ between the direction of the longitudinal center line $n$ of the automobile body 1 and the longitudinal axis of each hollow cylindrical elastomer member 3 is 45°. Identical materials and constructions were used for all the shock-receiving members 2 and the automobile bodies 1 of the assemblies P, Q, and R. Similarly, the distance between the two elastomer members 3 was substantially the same for all the assemblies P, Q, and R.

In the tests, loads are applied to the shock-receiving member 2 at different locations, and the amount of energy absorbed by the bumper assembly when the deflection of the bumper assembly reached to a certain predetermined magnitude. Two kinds of loads were used in the tests: namely, a first group of loads $B_i$ which are applied to different locations of the shock-receiving member 2 in parallel to the longitudinal axial direction of the automobile body 1; and a second group of loads $B_j$ which are applied to the right-hand corner E of the shock-receiving member 2, as seen in FIG. 13, at different angles $\alpha$ relative to the direction of the longitudinal axial center line $n$ of the automobile body 1.

Figure 13:
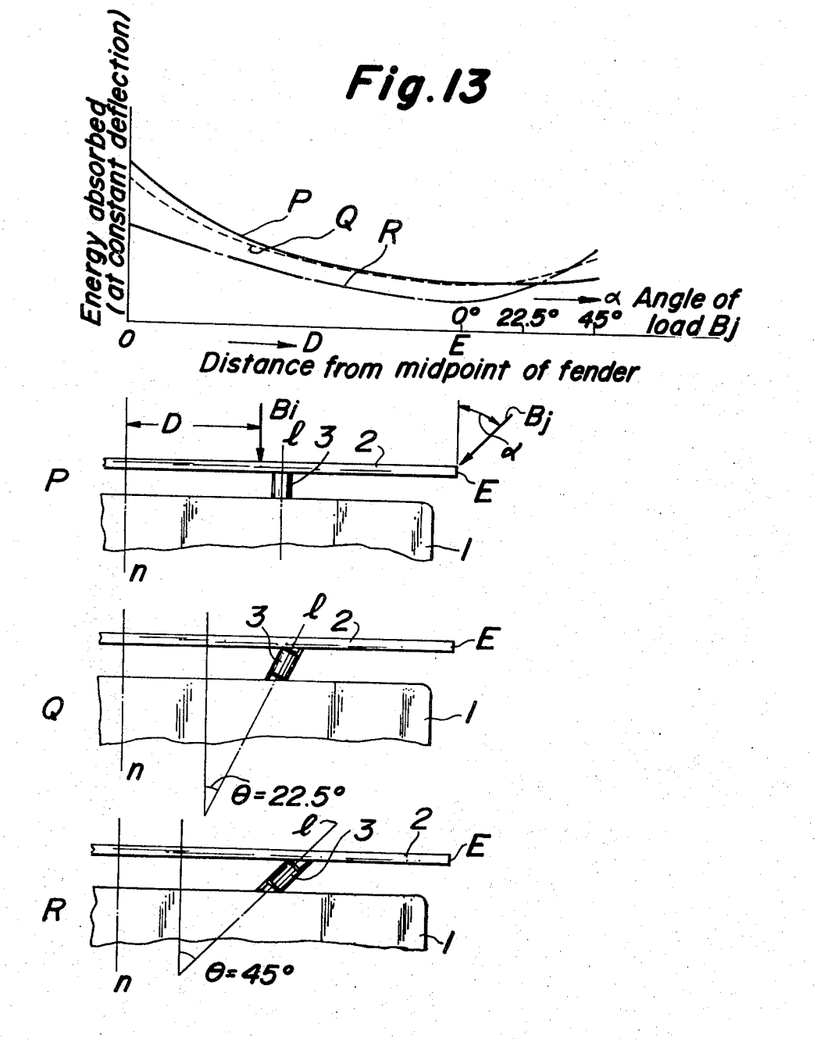
FIG. 13 is a graph, showing the effects of different angular dispositions of the hollow cylindrical elastomer members on the load-deflection characteristics of the automobile bumper assembly.

The results are shown in FIG. 13. In the graph of FIG. 13, the abscissa represents two quantities: namely, the distance D from the longitudinal midpoint O to each load applying point, as shown in the section OE of the abscissa; and the angle $\alpha$ at which the aforesaid load $B_j$ is applied to the corner E of the shock-receiving member 2 relative to the direction of the longitudinal center line $n$ of the automobile body 1, as shown to the right of the point E on the abscissa. The ordinate of the graph of FIG. 13 represents the amount of energy absorbed at the aforesaid predetermined deflection of the bumper assembly.

As apparent from FIG. 13, the fluctuation of the energy absorption in response to the difference of load applying locations is small in the case of the bumpers Q and R having angularly disposed cylindrical elastomer members 3, as compared with the corresponding fluctuation of the bumper assembly P having cylindrical elastomer members 3 disposed in parallel to the longitudinal center line $n$ of the automobile body 1. Thus, the use of angularly disposed cylindrical elastomer member 3 ensures a balanced or stabilized bumping effects which are comparatively free from fluctuation due to the difference of load applying locations.

In practice, the change of collisions at the corner E of the shock-receiving member 2 is comparatively high. For such collisions at the corner E of the shock-receiving member 2, the use of the cylindrical elastomer members 3 disposed at an angle $\theta = 22.5°$ (bumper assembly Q) provides a higher dumping effect, as compared with that with members 3 in parallel to the direction of the longitudinal axis $n$ of the automobile body (bumper assembly P). The energy absorption in the case of loads angularly applied to the corner E of the shock-receiving member 2 is further improved by increasing the angle $\theta$ between the direction of the longitudinal center line $n$ of the automobile body 1 and the longitudinal axis $l$ of the hollow cylindrical elastomer member 3 (bumper assembly R), as can be seen from the graph of FIG. 13.

The graph of FIG. 13 also shows that the overall level of the energy absorption of the bumper assemblies Q and R with the angularly disposed elastomer members 3 is reduced, as compared with that of the assembly P using elastomer members 3 aligned with the direction of the longitudinal center line $n$ of the automobile body 1. Such reduction of the overall energy absorption level in the bumper assemblies Q and R can be compensated for by incorporating additional elastomer member or members 3 in alignment with the direction of the center line $n$ of the automobile body 1, as shown in FIG. 12. More particularly, with the construction of FIG. 12, a high energy absorption level may be ensured both for loads in the direction of the center line $n$ of the automobile body 1 and for loads applied to the shock-receiving member 2 at different angles $\alpha$ relative to the aforesaid center line $n$ of the automobile body 1.

Figure 14:
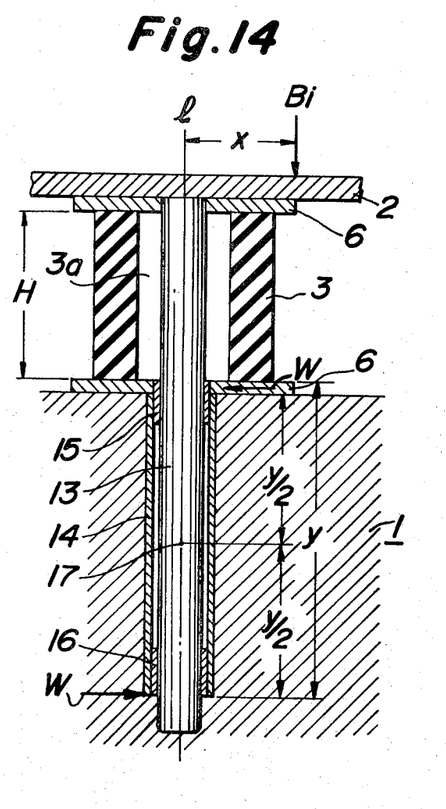
FIG. 14 is a schematic sectional view of a hollow cylindrical elastomer member with a core rod, to be used in the automobile bumper assembly, according to the present invention.

In order to further reduce the fluctuation of the load absorption in response to the difference of load applying locations, a suitable core rod may be added to each hollow cylindrical elastomer member 3, which core rod may slidably be carried by a guide member integrally secured to an automobile body. FIG. 14 illustrates such embodiment. A core rod 13 may be secured to one end of a hollow cylindrical elastomer member 3, so as to extend through the cylindrical elastomer member 3 in a coaxial manner therewith. In the embodiment of FIG. 14, one end of the core rod 13 is bonded to that mounting ring 6 which is secured to the shock-receiving member 2, e.g., a fender rod. The opposite end of the core rod 13 extends through a hollow space $3a$ of the elastomer member 3 and a cylindrical guide member 14 secured to the automobile body 1. A pair of spaced bearing sleeves 15 and 16 are inserted between the guide member 14 and the core rod 13, so as to ensure smooth sliding movement of the core rod 13 through the guide member 14. The bearing sleeves 15 and 16 are made of suitable material having a low coefficient of friction $\mu$, such as Teflon, nylon, polyethylene resin, and the like synthetic resin material.

Let it be assumed that a load $B_i$ is applied to the cylindrical elastomer member 3 in parallel to but with a distance $x$ from the longitudinal axial center line $l$ of the elastomer member 3. It is further assumed that this load $B_i$ generates two reaction forces W at the bearing sleeves 15 and 16, as shown in FIG. 14. If the distance between effective acting points of the two reaction forces W is represented by $y$ (the distance $y$ can be represented by the spacing between the farthest points of the two bearing sleeves 15 and 16), the following relation must be satisfied at a point 17 of the core rod 13 corresponding to the midpoint between the two reaction forces W.

$$X \cdot B_i = W \cdot (y/2) = W \cdot (y/2) = Wy \qquad (1)$$

Accordingly, $$W = (x/y)B_i \quad (2)$$

To allow the core rod 13 to slide through the guide member 14, the load $B_i$ must be greater than the friction resistance.

$$B_i > 2W\mu = 2 \cdot (x/y) \cdot B_i \cdot \mu \quad (3)$$

Thus, $$(x/y) \cdot \mu < 0.5 \quad (4)$$

In designing the guide member 14, and the bearing sleeves 15 and 16, the requirement of the equation (4) must be satisfied.

Figure 15:
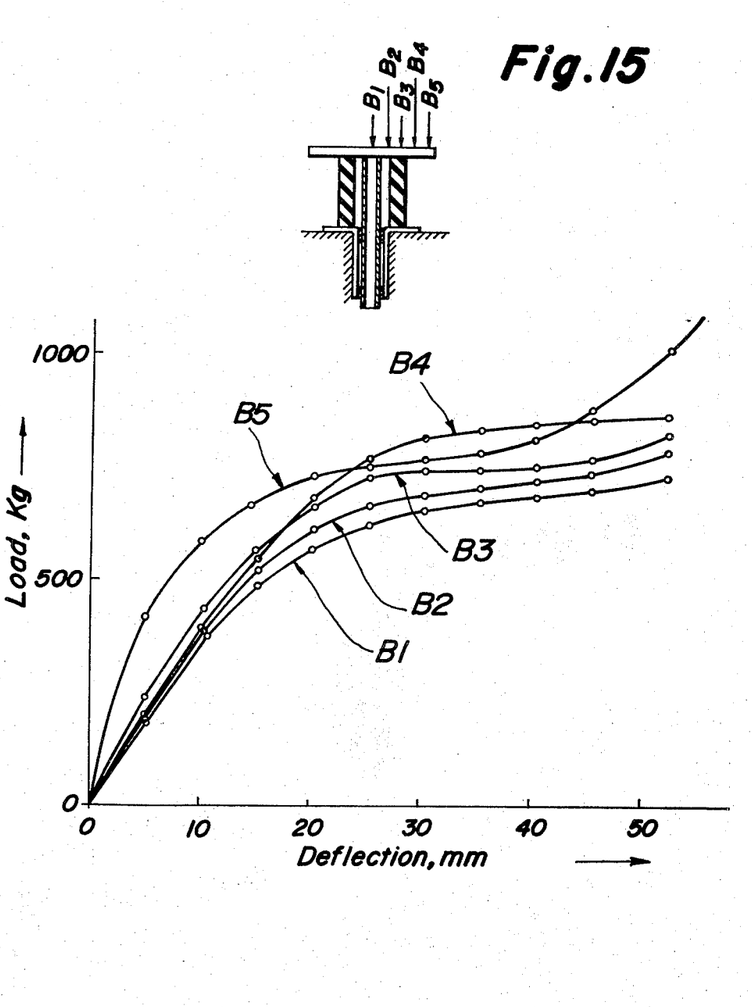
FIG. 15 is a graph, showing the load-deflection characteristics of the hollow cylindrical elastomer member of FIG. 14.

A test assembly of the construction of FIG. 14 was made by using a hollow cylindrical elastomer member 3 with an outer diameter 80 cm, an inner diameter 50 cm, a height H 100 cm. The material for the elastomer member 3 was rubber with a Shore A hardness 95°. A core rod consisting of a steel tube of outer diameter 40 cm was secured to one end of the elastomer member 3 in a coaxial fashion. A pair of bearing sleeves were inserted between the core rod and a guide member, with an effective spacing y of 170 cm between the two bearing sleeves. Loading tests were made by applying a variable load $B_i$ in parallel to but with a spacing x from the longitudinal axial center line l of the elastomer member 3. Five different values of the spacing x were used; namely, 0, 20, 40, 50, and 80 cm. Load-deflection characteristics curves thus determined are shown in FIG. 15, wherein the five curves B1 to B5 correspond to the aforesaid five values of the spacing x, respectively. (Three preliminary compressions were applied to the elastomer member 3 prior to each loading test.) The curves B1 to B4 are more or less similar with each other, and only the curve B5 shows different behavior. The reason for the different behavior of the curve B5 is because the comparatively large spacing x for this curve causes a large frictional resistance to the core rod 13.

As apparent from the load-deflection curves of FIG. 15, the hollow cylindrical elastomer member with the core rod of the aforesaid construction can provide a high dumping effect for loads applied at points spaced from the longitudinal axial center line of the elastomer member 3. It is noted in FIG. 15 that, except the curve B5, the load necessary for causing a given deflection generally increases as the spacing x increases.

FIG. 9 illustrates the effect of the core rod 13. The curve B1 corresponds to the curve B1 of FIG. 15; namely, the load-deflection curve of a fender assembly of FIG. 14 for loads $B_i$ which are applied to the hollow cylindrical elastomer member 3 at a position aligned with the longitudinal axial center line l of the member 3. A substantially identical load-deflection curve B1 was achieved for another bumper assembly similar to that of FIG. 14 but having no core rod upon application of similar loads thereto, because the core rod does not produce any special effects for loads which are in alignment with the axial center line l of the hollow cylindrical elastomer member 3. The curve B0 represents load-deflection characteristics of the aforesaid other bumper assembly without any core rod for loads which are offset from the axial center line l of the elastomer member 3. As apparent from the comparison of the curves B1 and B0, the energy absorption of the bumper assembly without any core rod is greatly reduced when the loads are offset from its axial center line l. It is recalled that the amount of energy absorbed by the bumper assembly is given by the hatched area of FIG. 9 beneath the load-deflection curve.

The curve $Bn$ of FIG. 9 represents load-deflection characteristics of the bumper assembly of FIG. 14 with the core rod for loads which are offset from the axial centr line l of the elastomer member 3. As can be foreseen from the test result of FIG. 15, the load-deflection curve $Bn$ lies above the curve B1. Thus, the energy absorption of the bumper assembly with the core rod increases when the loads are offset from the axial center line l of the elastomer member 3.

It can be concluded from FIG. 9 that the energy absorption for offset loads can be improved by using a core rod 13, as shown in FIG. 14.

Figure 16:
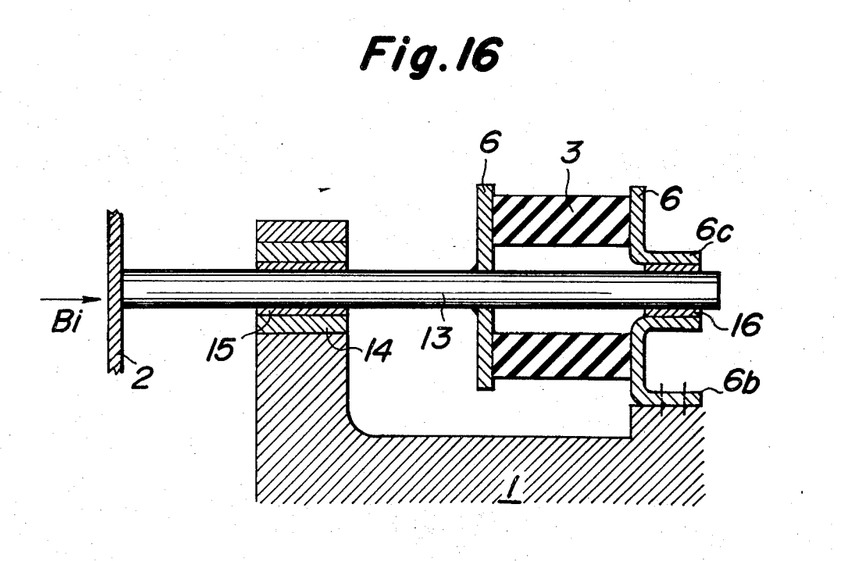
FIGS. 16 to 18 are schematic views, showing different modifications of the hollow cylindrical fender member of FIG. 14.
Figure 17:
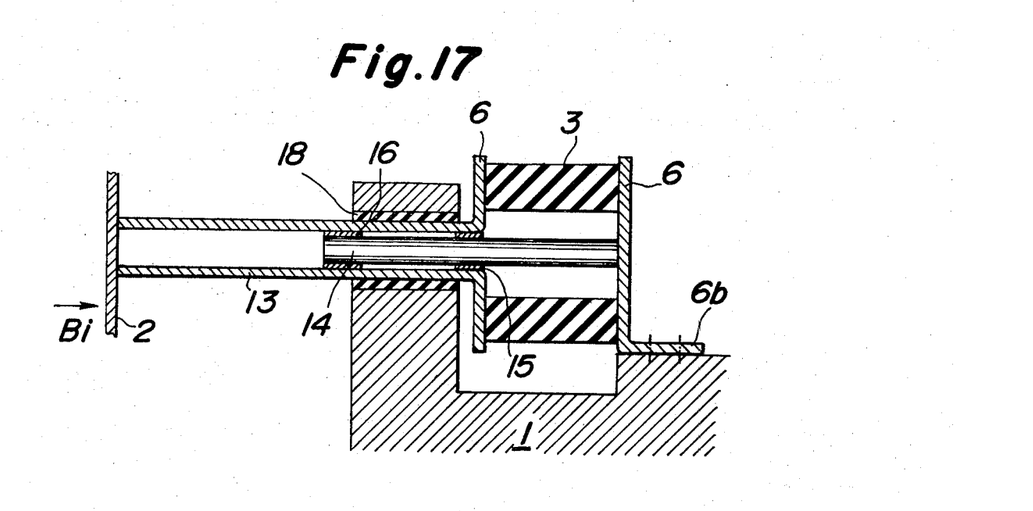
Figure 18:
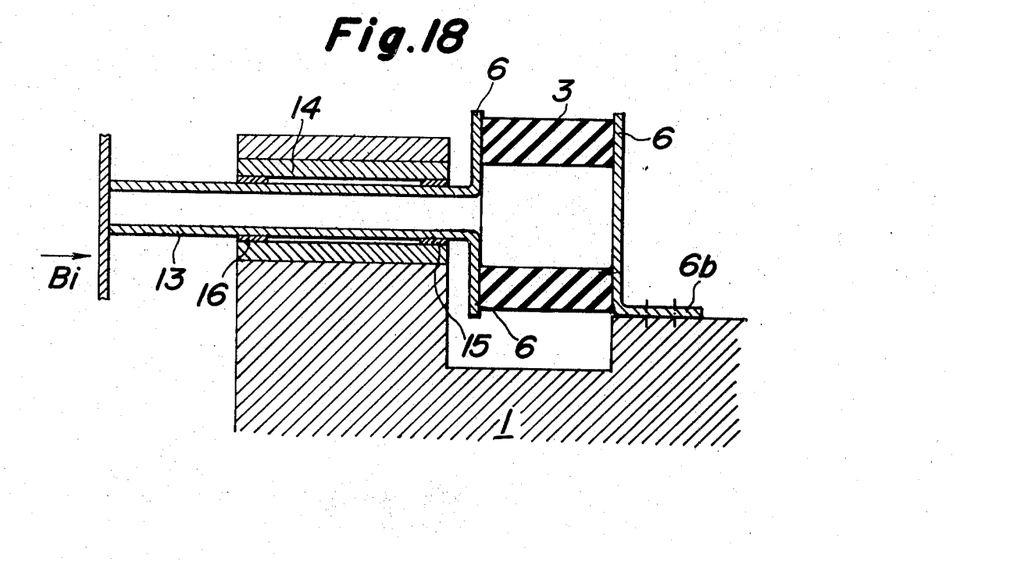

FIGS. 16 to 18 illustrate different modifications of the bumper assembly structure of FIG. 14. In the embodiment of FIG. 16, a fender side mounting ring 6 is spaced from a fender rod 2, and a core rod 13 has one end thereof secured to the fender rod 2 and extends through both of two mounting rings 6 secured to opposite ends of a hollow cylindrical elastomer member 3. The fender side mounting ring 6 is integrally secured to the core rod 13, for instance by welding. The automobile side mounting ring 6 is integrally secured to a suitable portion of automobile body 1, for instance, by rivetting (not shown). A mounting bracket 6b is integrally formed with the ring 6 on the automobile body side, so as to facilitate such mounting of the ring 6. One bearing sleeve 15 is supported by a guide member 14 which is connected to the body 1 at a portion between the fender rod 2 and the fender side mounting ring 6. Another bearing sleeve 16 is supported by a sleeved portion 6c of the mounting ring 6. The two bearing sleeves 15 and 16 slidably support the core rod 13.

In the embodiments of FIGS. 17 and 18, a core rod 13 is disposed at the outside of the hollow cylindrical elastomer member 3, which core rod 13 consists of a hollow metallic tube having its opposite ends secured to a fender rod 2 and a fender side mounting ring 6 of the elastomer member 3. In the case of the embodiment of FIG. 17, the movement of the core rod 13 is controlled by a guide member 14, which is a solid cylindrical rod extending from an automobile body side mounting ring 6 of the elastomer member 3 so as to fit in the tubular core 13. A pair of bearing sleeves 15 and 16 are disposed at the inside of the tubular core 13, which sleeves are supported by the aforesaid guide member rod 14. The outer peripheral surface of the tubular core 13 is supported by a tubular buffer 18, which is in turn carried by a suitable portion of the automobile body 1. The automobile body side mounting ring 6 is secured to the automobile body 1, for instance, by rivetting (not shown). In the case of FIG. 18, the movement of the tubular core 13 is controlled by a pair of bearing sleeves 15 and 16, which engage the outer peripheral surface of the core 13. The two guide sleeves 15 and 16 are carried by a tubular guide member 14 secured to a suitable portion of the automobile body 1.

In designing the structures of FIGS. 16 to 18, the dimensions and mechanisms must be so selected as to satisfy the conditions of the equation (4). It is apparent to those skilled in the art that the bumper assemblies of FIGS. 16 to 18 operate in the same manner as that of FIG. 14. With constructions of FIGS. 16 to 18, it is not necessary to bore any holes in the major portions of the automobile body 1.

It is possible to apply a prestress to the hollow cylindrical elastomer members 3 of the constructions of FIGS. 16 to 18, simply by properly selecting the initial relative positions among the two mounting rings 6, the automobile body 1, and the fender bar 2.

We claim:

1. An automobile bumper assembly, comprising an automobile body, a fender rod spaced from the automobile body, and a plurality of hollow tubular elastomer members disposed between said automobile body and said fender rod so as to cause the longitudinal central axis of each of said tubular elastomer members to extend from said body to said fender rod, each said elastomer member consisting of an elastomeric material with a Shore A hardness of 63° to 104° and a cross sectional area ratio $(S_1/S_2)$ of 1.44 to 4.0, $S_1$ being a cross sectional area of the elastomer member taken at right angles to the axial center line thereof and $S_2$ being a cross sectional area of the hollow space within the elastomer member taken in the plane of the area $S_1$, $S_1$ including $S_2$, a plurality of paired mounting rings, each pair of mounting rings being secured to opposite longitudinal ends of one of said tubular elastomer members, a plurality of core rods each being secured to one of the paired mounting rings of corresponding one of the elastomer members so as to extend in alignment with the longitudinal axial center line of the elastomer member, guide members formed in said automobile body so as to guide corresponding one of said core rods, and a plurality of paired bearing sleeves, each pair of sleeves being disposed between said guide and said core rod for slidably supporting said core rod at two axially spaced points.

2. An automobile bumper assembly according to claim 1, wherein one of the two mounting rings of each elastomer member is integrally secured to said fender body, and each said core rod is secured to the fender side mounting ring so as to extend toward the automobile body.

3. An automobile bumper assembly according to claim 1, wherein one of said mounting rings of each elastomer member is directly secured to the automobile body and the other one of the two mounting rings being disposed at a position between said fender rod and the elastomer member, each said core rod is secured to said fender rod so as to extend through said tubular elastomer member in alignment with the longitudinal axial center line of the elastomer member, fender side one of the two mounting rings being secured to said core rod, and each pair of the bearing sleeves consists of one sleeve disposed between said fender rod and said elastomer member and another sleeve secured to the automobile side mounting ring.

4. An automobile bumper assembly according to claim 1, wherein each core rod is a hollow tube having one end thereof secured to said fender rod and the opposite end thereof secured to the fender side mounting ring, each said guide member consists of a rod secured to the automobile body side mounting ring so as to extend into inside of the hollow tube, and each said pair of bearing sleeves are disposed between the rod constituting the guide member and said hollow tube.

* * * * *